Feb. 16, 1937. G. R. MARSHALL 2,070,670
ANAL RETRACTOR
Original Filed Feb. 26, 1935

INVENTOR
George R. Marshall
BY
Fred C. Matheny
ATTORNEY

Patented Feb. 16, 1937

2,070,670

UNITED STATES PATENT OFFICE 2,070,670

ANAL RETRACTOR

George R. Marshall, Seattle, Wash.

Application February 26, 1935, Serial No. 8,255
Renewed July 6, 1936

3 Claims. (Cl. 128—20)

This invention relates to improvements in surgical retractors and the primary object of this invention is to provide a surgical retractor embodying a ring like retractor frame and a plurality of retractor members readily engaged with or disengaged from said retractor frame, said retractor members being adapted to be secured to the parts to be retracted while disengaged from the retractor frame and to then be quickly and easily engaged with the retractor frame.

Another object of the invention is to provide retractor means especially adapted for retracting a part where there has not been any incision and where the retractor members must be caused to grip or clamp the part to be retracted.

Another object of the invention is to provide a retractor which is especially well adapted for use in obtaining proper exposure of the anal canal to facilitate surgical operations and treatments.

In rectal operations and treatments for the relief of rectal ailments, as hemorrhoids, fistula, ulcers and the like it is desirable to retract and expose the parts which are being operated on or treated. The retraction of these parts has heretofore usually been accomplished by assistants who take hold of the parts to be retracted with surgical forceps and hold said parts in retracted position during the operation or treatment. This method is objectionable for numerous reasons, as follows: It requires the services of several assistants to hold the parts retracted, because the force of retraction must usually be exerted in three or more different directions thus requiring forceps to be applied at as many locations. The assistants are often in the way of the surgeon who is operating or administering the treatment. This method is also liable to result in an unequal pull being exerted at different locations and may result in inefficient retraction which makes the work of the surgeon more difficult.

In accordance with my invention I provide a retractor which overcomes the hereinbefore stated objections to previously employed methods of anal retraction. This retractor employs ordinary surgical forceps as retractor members. These forceps may be disengaged from the retractor frame and applied separately and independently to the parts to be retracted and may then be quickly and easily made fast to the retractor frame. After the retractor is applied and properly adjusted it is entirely out of the way, and will exert an even pull on all of the surgical forceps and hold the parts which are being retracted in any desired position for any desired length of time without requiring the services of any assistants.

In the accompanying drawing Fig. 1 is a plan view of an anal retractor constructed in accordance with my invention illustrating the same as it may appear when in use.

Like reference numerals designate like parts throughout the several views.

Figure 1:
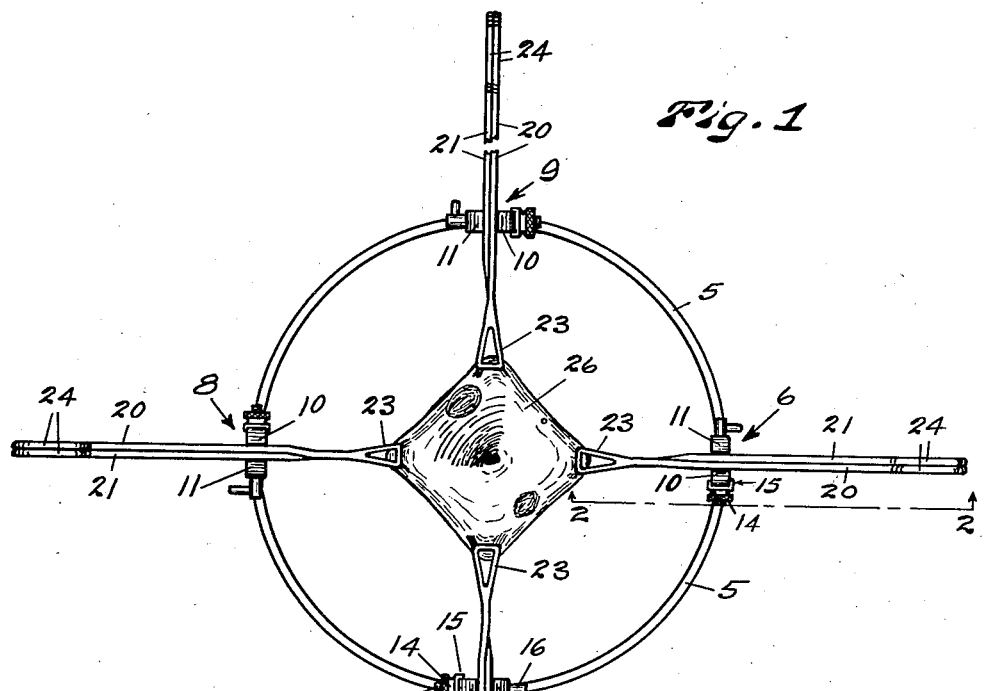
Figure 2:
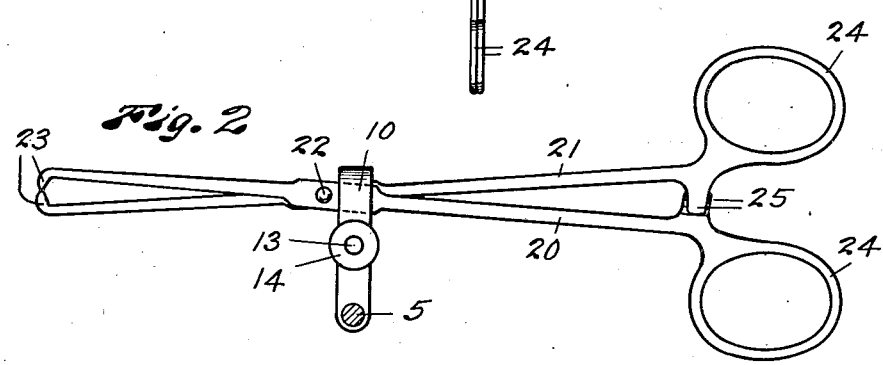
Fig. 2 is a fragmentary view on a larger scale than Fig. 1, partly in section and partly in elevation, substantially on broken line 2—2 of Fig. 1.
Figure 3:
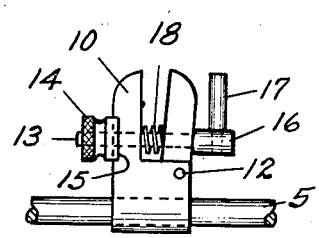
Fig. 3 is a fragmentary view in elevation on a larger scale than Fig. 1, illustrating one of the clamping devices for securing the surgical forceps or retractor members to the retractor frame.

In the drawing 5 designates retractor frame which preferably is of generally circular shape. Four holding members 6, 7, 8 and 9 are supported by the retractor frame 5, preferably at intervals of substantially ninety degrees. Each of these holding members comprises an upwardly extending clamp jaw 10 supported on the retractor frame 5 and another upwardly extending clamp jaw 11 connected by a pivot 12 with the clamp jaw 10. A screw 13 extends through both of said clamp jaws 10 and 11 and is threaded into a nut 14. The nut 14 is provided with means for preventing it from turning, as for instance the base portion of said nut 14 may have flange portions 15 which extend over the sides of the clamp jaw 10, as shown in Fig. 1. The screw 13 has an enlarged head portion 16 engaging the clamp jaw 10, as shown in Fig. 1. The screk provided with a finger piece 17 by means of which the screw may be turned. I have found that it requires less than one turn of the screw 13 to apply or release the clamp jaws and, for this reason, I prefer to make the finger piece 17 long enough so that it will be stopped by the retractor frame 5 and can not be turned quite one complete revolution. This will prevent getting the clamp jaws badly out of adjustment and thus save time and trouble. A compression spring 18 on the screw 13 between the clamp jaws 10 and 11 yieldingly urges said clamp jaws apart. Initial adjustment of the clamp jaws is had by pressing said clamp jaws together and turning the nut 14 until the proper setting has been obtained. After this has been done no further adjustment will ordinarily be required and less than one complete turn of the screw 13 will be required to apply and release the clamp jaws. This makes for speed and ease in the application and handling of the retractor.

Cooperating with each holding member 6, 7, 8 and 9 is a retracting member, preferably in the form of a surgical forceps. Each surgical forceps comprises two members 20 and 21 pivoted together at 22 for scissors like movement. The forceps members 20 and 21 have grip members 23 at one end and hand hold members 24 at the other end. Interlocking toothed portions 25 are provided on the parts 20 and 21 of the forceps for holding the grip members 23 of the forceps together after they have been applied and clamped onto a part which is to be retracted.

Figure 4:
Fig. 4 is a fragmentary sectional view of a retractor in which the retractor members are adjustable on the retractor frame.

The jaw member 10 will preferably be fixedly secured to the retractor frame to hold it upright where a retractor frame of circular cross section is used. By making the retractor frame of other than circular cross section and making the base portion of the jaw member of corresponding shape it is possible to provide a jaw member which is adjustable on the retractor frame and is always held in upright position. This may be done by making the retractor frame 5' of square cross section as shown in Fig. 4.

When the retractor is to be used the ring like retractor frame 5 is placed on the patient with the clamp jaws 10 and 11 extending upwardly and the frame positioned so that the part 26 to be retracted is within said frame. The surgical forceps or retractor members entirely separate and disassociated from the retractor frame 51 are then applied, one at a time, by engaging the grip members 23 of said surgical forceps with the part to be retracted. The toothed portions 25 of the forceps are latched and the forceps then drawn outwardly and the same time moved angularly downward until the handle portions of the forceps enter between the jaw members 10 and 11. The screw 13 is then turned enough to clamp the jaws 10 and 11 securely onto the surgical forceps. The surgical forceps are thus movable sidewise into and out of engagement with the holding members after they have been secured to the part to be retracted. When all of the surgical forceps have been applied to the part to be retracted and made fast to the retractor frame 5 the pull on the retracted parts will be equalized from all directions and the retracted parts will be readily accessible to the surgeon.

In applying the surgical forceps or retractor members to the walls of the anal canal, when the device is used as an anal retractor, it is necessary that each pair of forceps be entirely detached from the retractor frame while said forceps are being inserted into the anal canal and clamped onto the walls of said canal. The clamp jaws 10 and 11 of the holding means are quickly and easily clamped onto, or released from the forceps and said clamp jaws are positioned so that the surgical forceps may be quickly and easily swung downwardly between said jaws after the surgical forceps have been engaged with the parts to be retracted.

This retractor is simple in construction, quick and easy to apply, efficient in operation, sanitary and easily sterilized and provides for the use of retractor members or forceps which may be quickly and easily attached to the retractor frame in any desired adjusted position after they have been caused to grip the part which is to be retracted. By making the retractor members or forceps quickly and easily attachable to the retractor frame after they have been attached to the part to be retracted I provide a retractor which is especially well adapted for anal surgery where it is often necessary to reach into the anal canal, grip the walls of the same and turn the terminal portion of said anal canal partially inside out in order to properly expose the parts to be operated on or treated.

The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. In a retractor of the class described, a retractor frame; a plurality of forceps like retractor members having grip means adapted to engage parts to be retracted, a plurality of adjustable holding members mounted on said retractor, said holding members having jaws receiving and holding said retractor members when the retractor members are attached to the part to be retracted, said jaws providing an opening receiving the retractor members after said retractor members are attached to parts to be retracted; and readily operable means moving said holding members into engaged or released position relative to said retractor members.

2. In a retractor of the class described, a retractor frame; a plurality of forceps like retractor members having grip means adapted to engage parts to be retracted; a plurality of adjustable holding members mounted on said retractor frame, each of said holding members having two upwardly directed clamp jaws relatively movable toward and away from each other the upper end portions of said jaws being spaced apart to receive therebetween said retractor members after said retractor members have been attached to parts to be retracted and a readily operable screw member moving the jaws of said holding member into engaged or disengaged position relative to said retractor members.

3. In a retractor of the class described, a retractor frame of generally circular shape; a plurality of retractor members positioned with their inner ends toward the center of said retractor frame, said retractor members having grip means on their inner ends adapted to engage parts to be retracted; and a plurality of holding members mounted on said retractor frame in spaced apart relation, said holding members having upwardly directed clamp jaws providing openings therebetween receiving said retractor members when the inner ends of said retractor members are gripped onto parts to be retracted and clamp jaw moving means connected with said clamp jaws.

GEORGE R. MARSHALL.